Figure 1:
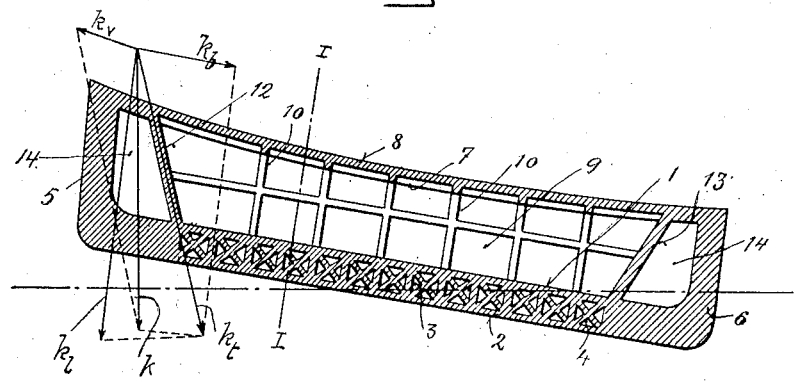

K. BARTELS, DEC'D.
G. BARTELS, ADMINISTRATOR.
REINFORCED CONCRETE SHIP.
APPLICATION FILED DEC. 10, 1918.

1,356,956.

Patented Oct. 26, 1920.

UNITED STATES PATENT OFFICE.

KNUD BARTELS, DECEASED, LATE OF COPENHAGEN, DENMARK, BY GUDRUN BARTELS, ADMINISTRATOR, OF COPENHAGEN, DENMARK.

REINFORCED-CONCRETE SHIP.

1,356,956. Specification of Letters Patent. Patented Oct. 26, 1920.

Application filed December 10, 1918. Serial No. 266,141.

*To all whom it may concern:*

Be it known that KNUD BARTELS, deceased, late a citizen of the Kingdom of Denmark, residing at Copenhagen, Denmark, did invent certain new and useful Improvements in Reinforced-Concrete Ships, of which the following is a specification.

The present invention relates to ships constructed wholly or in part of reinforced concrete, and has for its object, by suitable construction of the bottom, stem and stern of such ships, to take up the vertical shearing forces acting on the ships in rough sea and to transmit them as tensile and compressive forces to the bottom and deck and, thereby, especially in reinforced concrete ships, to render possible a considerable decrease in weight of the sides of the hull and, besides, an extremely advantageous construction of the hull itself.

On account of the very considerable shearing forces acting on the hull of a ship, when this is moving forward in rough sea from wave to wave, and being taken up by the ship as shearing stresses in the sides of the hull, reinforced concrete ships have heretofore had to be made with sides of relatively very great thickness, the necessary thickness of the sides being as much as 6 inches and even more, although the permissible shearing stress was figured as high as 250 to 300 lbs. per square inch although, according to the standard rules of construction, it ought not to be more than at most 65 lbs. per square inch. The high shearing stress of 250 to 300 lbs. per square inch is made justifiable by the use of an unusually high percentage of iron and by the concrete mixture being made very rich (a mixing proportion of one to two or one to three).

The use of so heavy sides in ships is, obviously, very unsuitable, and as the amount of iron required very nearly corresponds to the amount of iron which would be needed for sheathing the sides of a corresponding iron ship with iron plates of suitable thickness, the advantages of using concrete as a shipbuilding material have, heretofore, really been quite illusory.

According to the present invention, this serious drawback is removed by the ship's hull being built so that the shearing forces acting on the ship do not produce shearing stresses in the hull of the ship, but are taken up by the bottom and either the deck or the sides as tensile or compressive stresses. This is attained by the ship's bottom being made as a parallel-chorded lattice girder with diagonals and, maybe, also verticals, for instance like a girder of the Visintini system and cast in one with the stem and stern of the ship. The stem and stern are made in one with the beams supporting the deck, or, perhaps, with the deck proper or with the ship's sides which will be of slight thickness on account of the special construction of the bottom, and hereby the hull gets a very stiff shape and, as it will be mentioned more explicitly below, a very suitable construction for resisting the forces exerted on the exterior of the hull. This construction offers, in addition, certain other considerable advantages, technical as well as practical, for instance (1) the ship's sides may be made of other materials than concrete, such as iron or wood, (2) side-keelsons and main keelsons may be omitted, (3) the bottom plates resisting the water pressure get a short span (4) the ship gets a double or even treble bottom, and (5) a relatively slight weight of the hull which circumstance, as it is well known, is of no small importance to the construction of concrete ships.

The bottom, as mentioned above, forms a girder with parallel chords whose straight or, as the case may be, more or less curved chords, in combination form a double bottom, and whose latticing consists of vertical and diagonal plate-shaped braces running longitudinally cross-wise or, preferably, in both directions as in the girders of the Visintini system.

The stem and stern may be made solid, that is to say, in ordinary known manner, as joints between the sides of the ship or, much more suitably, like the bottom, as lattice construction, the parallel-chorded girder forming the bottom being continued through the stem and stern clear up to the deck, so that the bottom, stem and stern together form what is termed in the technical statics a two-hinged latticed arch.

By this construction of the stem and stern, the shearing stresses which are not entirely avoidable in solid stems and sterns, even if the bottom be constructed as a truss with parallel chords are completely avoided.

The top and bottom chord in the girder constituting the ship's bottom may also be fitted with ribs running longitudinally in the ship. If the verticals in the girder be provided, the frames or rather the constructions acting as such and, perhaps, being sloping instead of vertical, are not continued across the ship's bottom, but stop at the bottom chord of the girder forming the ship's bottom.

The drawing shows two modes of constructing the invention,

Figure 1 showing a longitudinal section, and

Figure 2:
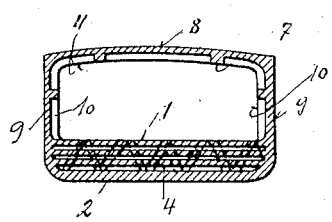
Figure 3:
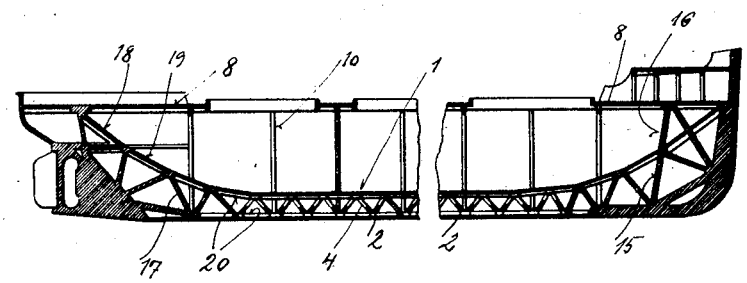
Figure 4:
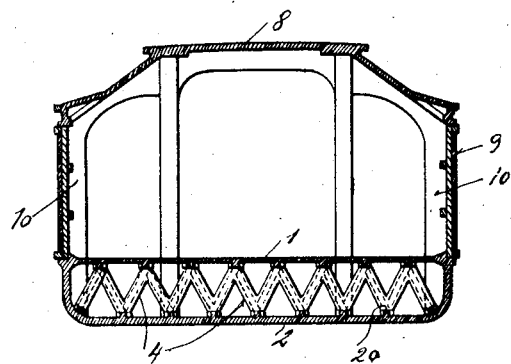

Fig. 2 a cross-section of a reinforced concrete ship with solid stem and stern, while Figs. 3 and 4 show a longitudinal section and a cross-section, respectively, of a reinforced concrete ship with stem and stern executed as lattice construction.

The ship's bottom, in the construction shown in Figs. 1 and 2, consists of two plane, parallel reinforced concrete slabs 1 and 2 connected with and made in one with vertical transverse reinforced concrete struts 3 and, in the panels between these, diagonals 4, so that the ship's bottom becomes a parallel-chorded lattice girder of the Visintini system. Between any two adjacent verticals 3, there are provided, as shown, two diagonal members 4, but the bottom may, obviously, also be made, for instance with only a single diagonal between any two verticals, and the slabs 1 and 2, instead of being plane may be made curved in any suitable manner.

5 is the stem and 6 the stern, both cast in one with the bottom plates 1 and 2 and interconnected, at top, either by means of reinforced concrete beams 7 cast in one with the stem and stern and supporting the deck 8, or perhaps by means of the deck 8, which would then also have to be made of concrete. The ship's sides 9 may, of course, also serve as connecting members for the stem and stern, either alone or in combination with the deck beams or the deck. The bottom of the ship will then jointly with the stem and stern form a two-hinged arch, having the deck, the longitudinal beams of the deck or the ship's sides as tensile and compressive ties.

10 are the frames cast in one with the bottom 1, 2 and extending from the vertical ribs or partitions 3 and forming closed vertical or sloping frames, each with a member extending below the deck, viz. the beam 11, supporting, together with the beams 7, the deck 8 which may be made of plates.

12 and 13, respectively, are the fore and aft collision bulkheads of the ship, cast in one with the stem 5 and stern 6, respectively, and the ship's bottom, so that there is formed a watertight compartment 14 between each of the said bulkheads and the stem and stern, respectively, these compartments being accessible only from above. The bulkheads are slanting, as shown, and diverging at top. The object of this is to transmit the vertical forces to the bottom.

Suppose the ship, in rough sea, to assume the position shown in Fig. 1, on top of a wave, then the portion of the ship hanging free above the wave will be actuated, owing to gravity, by a vertical force $k$ (shearing force) which, in the heretofore known construction of iron and reinforced concrete ships, has to be taken up as a shearing force in the ship's sides, but here is transmitted to the ship's bottom through the bulkhead 12, as the force $k$ may be resolved into a component $k_v$, acting along the longitudinal axis of the ship (or the deck), which component may be taken care of as a tensile stress in the deck stringers 7 (or the deck 8) or by the ship's sides, and into a compressive force $k_t$ acting along the bulkhead 12 and in its turn, being resolvable into a force $k_b$, parallel with the bottom and producing compressive stresses in both the bottom plates 1 and 2, and a force $k_1$, at right angle to the bottom, and exerting a bending stress on the bottom, producing thereby, tension in the slab 1 and compression in the slab 2.

If the ship be placed between two wave tops, so that its central portion is hanging free, or more or less free, then all the components $k_v$, $k_t$, $k_1$ and $k_b$ will change direction, so that the compressive forces become tensile forces and vice versa but, otherwise, the transmission of forces remains the same.

The plate-shaped stiffeners or braces in the bottom, instead of or besides running athwartships may, in certain cases (depending on the use, kind and size of the ship), run lengthwise or in both directions. If the bottom has diagonal members both in the longitudinal and, as shown in Figs. 2 and 4, in the transverse direction, it forms a Visintini girder proper, that is: a parallel-chorded girder with plate-shaped diagonal braces, running both in the longitudinal and in the cross-sectional direction of the girder, so that the bottom girder becomes a lattice girder both in the longitudinal and in the transverse direction. The lengthwise and crosswise running braces cut through one another, and thereby these braces together form, as known, rows of pyramidal braces in the girder, running lengthwise and crosswise of the girder. The apexes of these pyramids, in the different rows, are located alternately in the top and bottom chord of the girder.

The vibrations originating from the ship's engines and the like are absorbed by the stiff bottom construction and are only to a slight degree transmitted to the other portions of the ship. If the ship's sides are not used as ties (or struts) between the stem and stern, they may, if so desired, be made of other material than concrete, for instance of wood or iron.

In the mode of construction shown in Figs. 3 to 4, the stem and stern are executed as lattice constructions.

As it appears from Fig. 3, the lattice construction constituting the bottom extends here without interruption up through stem and stern to the deck 8, so that stem and stern are not solid as in the construction shown in Figs. 1 to 2, but are of lattice girders and form jointly with the bottom, a latticed two-hinged arch. As it appears from Fig. 4, the diagonal stiffeners in the bottom are open, while the corresponding stiffeners in stem and stern are solid. This, of course, is not necessary, as all the stiffeners, diagonal as well as vertical, if such are used, may be made open or solid, depending on what may be considered to be necessary or suitable.

In the present case, the stiffeners and the inner slab 1 of the portions of the lattice girder which form the stem and stern, serve as watertight bulkheads, so that the front collision bulkhead is formed, for instance, of the diagonal member 15 and a member 16 being in line with the latter and constituting an extension of the top-chord 1 of the lattice girder, while the aft collision bulkhead is formed for instance by the stiffener 17 and the member 18, 19 of the lattice girder's top-chord 1.

The shearing forces which inevitably will appear in the solid stem and stern indicated in Figs. 1 and 2, when the ship works in high sea, and which will expose these to stresses exactly of the kind which ought to be avoided, wherever concrete is used, are avoided entirely by constructing the stem and stern as shown in Figs. 3 and 4 as extensions or ends of the parallel-chorded girder constituting the bottom, as all the shearing forces will be taken care of as compressive and tensile forces in the diagonals, verticals and chords of the bottom, stem and stern.

As in the construction shown in Figs. 1 to 2, so also in the construction shown in Figs. 3 to 4, either the ship's sides, the deck or the stringers supporting the latter, or any number of these members, may form ties between the stem and stern. Generally the ship sides will, however, be made from reinforced concrete and, as in all other concrete ship-constructions in one with the bottom and the deck, in such a way that the hull of the ship will act, in known manner, as a tube-shaped beam toward the forces that affect the ship in rough sea. The bottom of the ship will, however, always take up the majority of these forces as tensile and compressive stresses.

If, as shown in Figs. 3 to 4, there are no vertical struts in the bottom, the frames 10, instead of being continued across the bottom, may be stopped at the bottom chord 2 of the parallel girder forming the bottom. 20 are longitudinal ribs or beams in the top and bottom chord and may, most suitably, as shown in Fig. 4, be located, on the insides of slabs 1 and 2.

The bracings in the bottom, stem and stern, their shape and the extension of the parallel girder up through the stem and stern may of course be constructed and arranged, according to the requirements, in other manners than precisely as shown in Figs. 1 to 4, without therefore coming outside of the scope of this invention, and the longitudinal stringers 7 may be omitted.

Having now particularly described and ascertained the nature of said invention and in what manner the same is to be performed, what is claimed is:—

1. In a reinforced concrete ship, a bottom formed as a parallel-chorded girder with diagonal plate-shaped braces between the parallel-chords.

2. In a reinforced concrete ship, a bottom formed as a parallel-chorded girder, with plate-shaped braces between the parallel-chords, said girder extending through the stem and stern up to the deck, so that the ship bottom, the stem and the stern together form a parallel-chorded lattice girder.

3. In a reinforced concrete ship, a bottom, a stem and a stern forming together a parallel-chorded lattice-girder with plate-shaped, diagonal braces running lengthwise in the bottom between the parallel-chords.

4. In a reinforced concrete ship, a bottom, a stem and a stern forming together a parallel-chorded lattice-girder, with diagonal braces running lengthwise and crosswise in the bottom and intersecting with each other in such a way that together they form rows of pyramidical braces between the top-chord and bottom-chord of the girder.

5. In a reinforced concrete ship, a bottom, a stem and a stern forming together a parallel-chorded lattice-girder, with diagonal braces running lengthwise and crosswise in the bottom and intersecting with each other and water-tight collision bulkheads, formed by a part of the braces and the top-chord in the lattice-girder.

6. In a reinforced concrete ship, a bottom, a stem and a stern forming together a parallel-chorded lattice-girder, with diagonal braces running lengthwise and crosswise in the bottom and intersecting with each other, watertight collision bulkheads, formed by a part of the braces and the top-chord in the lattice-girder and ship-sides formed of a material other than reinforced concrete.

In witness whereof I have hereunto signed my name in the presence of two subscribing witnesses.

GUDRUN BARTELS,
*Administrator of Knud Bartels, deceased.*

Witnesses:
T. B. ALFORD,
E. W. ERLSTOW.